Patented Aug. 9, 1949

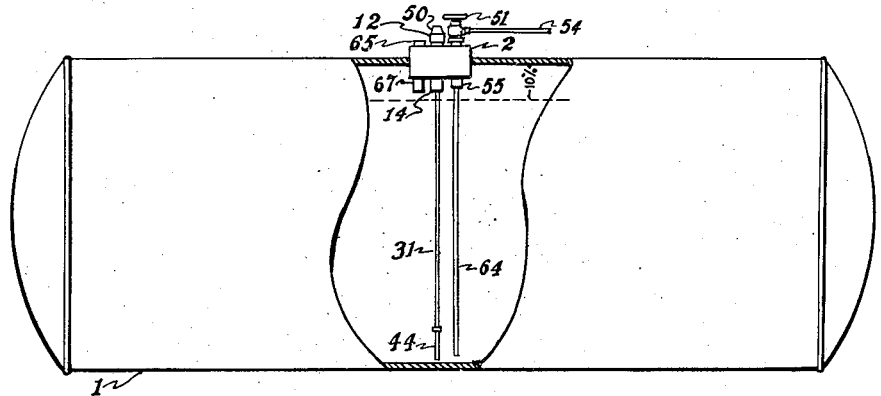
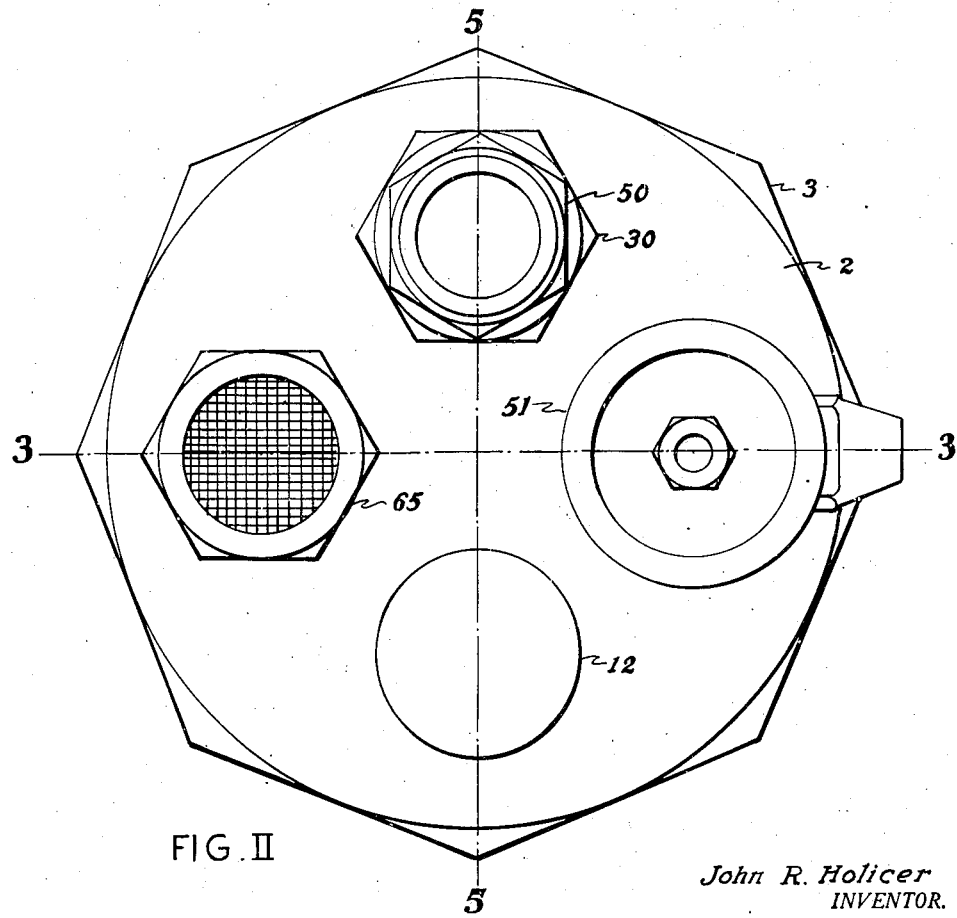

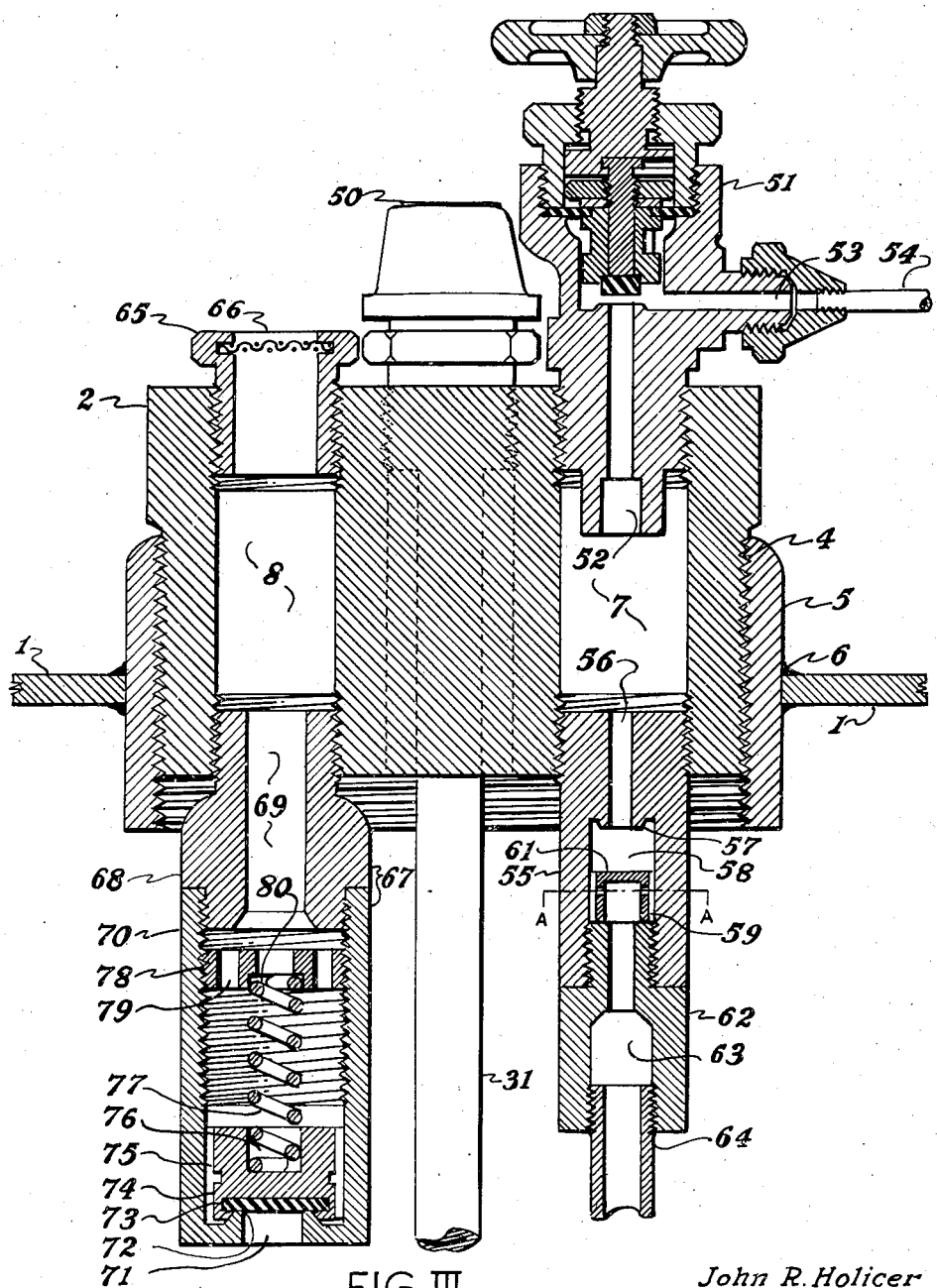
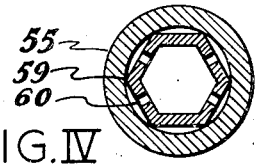
FIG.III
FIG.IV
John R. Holicer
INVENTOR.

2,478,760

UNITED STATES PATENT OFFICE 2,478,760

CONTROL FITTING FOR LIQUEFIED PETROLEUM GAS TANKS

John R. Holicer, Shreveport, La.

Application September 2, 1943, Serial No. 501,019

1 Claim. (Cl. 62—1)

This invention has to do with apparatus and mechanism for controlling and handling liquefied petroleum gas, such as butane and similar fuels.

It is primarily a single fitting comprised of a removable control head carrying specially designed and constructed control fittings; and this control head may be inserted through the shell of a closed pressure vessel adapted to store and dispense fuel of the character indicated.

The use of this fitting makes necessary only one opening in the storage tank; and it dispenses with the necessity for any dome, standpipe or other extension of the pressure vessel itself.

Above all, the construction and disposition of this fitting provides the maximum of safety in handling the unstable, volatile and highly inflammable and explosive liquefied petroleum gases.

This application is to be considered as a continuation in part of my co-pending application for patent under Serial No. 492,738, later issued under Patent No. 2,386,554.

This application is further to be considered in connection with my earlier Patent No. 2,188,597, and as an improvement thereon.

This application is also to be considered in connection with my co-pending application for patent under Serial No. 501,022 which was filed on the same day as the instant case, later issued under Patent No. 2,464,179 on March 8, 1949.

The prior art in control fittings, carried by or associated with butane storage and dispensing tanks, is briefly outlined as follows:

The earlier tanks were provided with a number of separate fittings of stock design and old construction, each separately carried outside of the tank itself; and usually each had a separate opening for attaching the fitting to the tank. For the most part, these fittings were usually attached separately some distance from the tank by fixing them into separate tubular extensions or standpipes.

The result of this construction was to provide a series of pipes extending out of the tank, each carrying a valve or fitting; and each easily broken off, so that numerous violent explosions and fires resulted from leaks and breakage. Also such construction greatly weakened the wall or shell of the pressure vessel containing the fuel.

Later there grew up the practice of providing one large standpipe or dome extending from the tank. On the outside, and usually the top side, of this extension, the control valves and fittings were separately screwed or bolted in place. Even so, these separate valves were easily broken off; and the danger of explosions continued. However, this construction allowed a stronger single standpipe to be provided; and it did not so severely weaken the shell of the tank.

In all the prior art it appears that the fittings and control apparatus were carried outside of the tank or outside of the dome-like extension. This meant that they were required to be built of very heavy materials with stout walls and sufficiently strong to withstand the considerable pressure exerted from within the tank.

The instant invention eliminates at once all the dangers arising from the external disposition and placement of the heavy and expensive fittings; and it eliminates the dangers which arose when these fittings were broken off or damaged to the point of leaking.

This invention provides and carries within the tank itself specially designed fittings, depending from a single head, which are suitable for filling the tank, removing its contents, gaging its contents, and relieving excess pressure therein.

Among the objects of this invention are the following:

(a) The provision of a single, one-piece, unitary fitting which may be removably inserted in a single opening in the tank wall.

(b) The provision of passageways through the fitting adapted to communicate with valves depending therebelow and carried within the body of the tank.

(c) The elimination of extensions, valve parts or protuberances outside the tank, which, when cracked or broken off, create conditions of extreme danger and present the hazards of fire and explosion.

(d) The disposition of control valves and fittings within the tank (instead of outside it), so that there is an equalization of pressure both inside and outside such valves and fittings, eliminating the possibility of their rupture and rendering them harmless in case of such rupture.

With these objects in view, a preferred form of this device is disclosed in the accompanying drawings and further set out in this specification.

However, it may be readily seen that adaptations and changes from the exact construction of these disclosures may be made without in any manner departing from the spirit and objects of this invention.

In the drawings:

Fig. I shows a diagrammatic and partly sectionalized view of a liquefied petroleum gas storage tank having mounted therein the control head and fittings which is the subject of this invention.

Fig. II is a plan view of the control head, carrying its usual complement of fittings.

Fig. III is a sectionalized elevation of the control head taken along lines 3—3 of Fig. II.

Fig. IV is a plan view taken along the line A—A of Fig. III.

In making detailed references to the parts of this device shown in the drawings, they are indicated by reference numerals; and numeral 1 shows a liquefied petroleum gas storage tank in which is mounted the control head assembly wherein the body of the head is designated as 2. This body has shoulders 3 around its topmost part and is provided with threads 4 on its lower end. It may be threaded into an opening in the tank provided by a collar 5 set into the wall of the tank and there affixed by welding 6 or other suitable means of attachment.

The head is provided with four vertical passageways therethrough; and these are the fuel delivery passageway 7, the pressure relief passageway 8, the filler passageway 9, and the gage passageway 10. Each of these passageways is provided with internal threads at both their upper and lower ends, except that the passageway 10 need be provided with such threads only at its upper end.

The filler passageway 9 has mounted therein filler adapter 11, provided with shoulders for turning it, and its lower end threads into the passageway, while its upper end is protected by a threaded filler cap 12 having a gasket 13 therein.

This cap remains in place except when the tank is being filled. Then the cap is removed and in its place, a hose adapter (not shown) is screwed onto filler adapter 11; and the hose adapter may carry a suitable flexible hose to connect with the truck delivery tank bringing fresh liquid fuel.

It will be seen that the lower part of the control head body 2 passes through and comes to rest just within the tank wall. This installation is usually made in the top of the tank. Therefore, the lower extension of the head is within the tank; and all fittings of every kind depending from this head are within the tank itself.

Mounted in the top of passageway 7 there is a conventional hand-operated shutoff valve 51. This valve is provided with a valve inlet channel 52 communicating with passageway 7, so that fluid ascending the passageway may pass into the valve. There is a valve outlet 53 for discharging fluid from the valve into fuel service conduit 54.

Valve 51 usually remains open at all times. In fact, it is rarely ever used, because it is desired that gas be available to the premises where consumed at all times. Usually this valve is operated only in an emergency; and even then it is not required that it be closed to prevent the escape of fluid through passageway 7, because of the provision in the lower end of this passageway of the excess flow check valve 55.

Valve 55 is removably carried in the lower end of passageway 7; and it depends entirely into the storage tank 1. This valve is provided with a channel 56 and a valve seat 57; and immediately therebelow is an enlarged channel 58 carrying the valve thimble 59.

This thimble has an opening or several ports 60 through its side walls; and it is provided with an upper face 61 which comes to rest upon valve seat 57 whenever the valve is closed.

Normally there ascends through the excess flow check valve 55 sufficient fuel, either as liquid or gas, to supply the fuel demands of the consumer; and the flow of this quantity of fuel is sufficient to lift the thimble against the valve seat. However, should there occur a break in line 54 or a considerable leak in any of the connections leading away from the top of passageway 7, such leak would be only momentary, because the sudden uprush of fluid into thimble 59 would be more than can be discharged therefrom through ports 60; and the thimble would be lifted up and be seated against valve seat 57, thus closing the valve.

Normally there is an equal pressure both above and below thimble 59 in the passageways leading to and from this thimble, so that the thimble, by reason of its weight, remains at rest. When the pressure is suddenly released above the thimble, as by the complete rupture of service conduit 54, thereafter the pressure on the top of the thimble would be very low or even atmospheric; but storage tank 1 carries a considerable gas pressure at all times; and the preponderance of pressure in the tank would immediately lift thimble 59 up against its seat and close the valve.

To keep thimble 59 in its proper place, and to afford a rest therefor, and also to allow its removal and examination, and to allow cleaning of valve 55 when necessary, there is provided in the lower end of the valve the adapter base 62, having a channel 63 therein, which discharges its contents into the thimble. Depending immediately below the adapter base is dip tube 64. This tube extends into the storage tank an appropriate length, which is usually a point very close to the bottom of the tank.

Since liquid fuel fills the lower part of the storage tank, and the gas emanating therefrom accumulates in the upper part of the tank, then the extension of the dip tube 64 to a point near the bottom of the tank insures that liquid fuel may be supplied upwardly through passageway 7 at all times during the normal operation and use of this control head for supplying and delivering fuel from the tank.

Ordinarily the liquid fuel flowing outwardly from the tank through conduit 54 is carried to a device or chamber for vaporizing the liquid into gaseous fuel.

However, should it be desired to withdraw the gas accumulating in the top of tank 1 directly from the tank and conduct it to consuming appliances, without the intervention of any further vaporizing apparatus, then this can easily be done by simply removing and not using dip tube 64. When this tube is dispensed with, the gas vapor enters the channel 63 and passes upwardly through valve 55 into passageway 7 from which it is discharged through valve 51 to conduit 54.

The control head is provided with relief valve passageway 8, which carries removably in the top thereof the screen bushing 65 which is fitted with a screen 66 to keep out insects and foreign materials from passageway 8. The openings in screens 66 will allow full passage to the atmosphere of fluid discharged from relief valve 67 which is removably carried in the lower end of this passageway.

Valve 67 depends entirely within tank 1; and it is constructed of light weight materials and has thin walls, because its disposition in the tank (instead of outside it) causes equal pressure on the walls, both externally and internally, whenever this valve relieves. When it is in normally closed position, the pressure of the tank is exerted against the outside walls of the valve; and this valve, being in effect a cylinder, will not be crushed or distorted by this pressure.

Safety relief valve 67 has a head 68, which is threaded into passageway 8, and a valve body 70 depending below and removably attached to the head.

Relief channel 69 within the valve communicates at all times with passageway 8; and it likewise communicates with the tank when the valve is opened, and fluid passes into the valve through inlet 71.

Around this inlet there is arranged valve seat 72; and immediately thereabove and resting thereon is valve disc 73 which is carried by the valve plunger 74.

This plunger may be of cylindrical design and somewhat smaller than the internal diameter of the valve body which houses it, so as to provide passageway for fluid ascending around the plunger; or it may be given another shape. For instance, it can be made hexagonal, and such design will allow ample passageways between the exterior of the plunger and the wall of the valve body. This fluid passage space is indicated by numeral 75.

A spring guide 76 is provided in the plunger, and the base of spring 77 rests therein. The tension of the spring is adjusted so that the valve may be set to relieve at a given and desired pressure; and for this purpose there is provided spring adjusting disc 78, which may be carried within the valve body by being screwed therein.

Openings 79 are provided in this disc for the upward passage of discharging fluid. The adjusting disc also provides spring guide 80 in which the upper end of the spring is placed.

Whenever excess pressure builds up in the storage tank beyond that desired, this pressure finds relief through valve inlet 71 by lifting up the plunger against the spring and passing upward and outward through the valve and through passageway 8 and through screen 66 to the atmosphere. Immediately after such relieving action by the valve, spring 77 instantly closes the valve. No part of the valve or its operating mechanism is outside the tank or above the control head. It depends below the head and within the tank, where it is safe from tampering or breakage.

The advantages of this control head are obvious, in light of the objects hereinabove set out and the details of its construction given. Its operation has been indicated, but is more completely stated as follows:

When it is desired to fill the tank, cap 12 is removed, and a hose connector is attached instead, carrying the delivery hose, through which liquid fuel may be pumped into the tank. Fuel may also be allowed to flow into the tank by gravity. In any event, the weight of the liquid fuel or the pressure of the pump will effect the opening of filler valve 14 and allow the tank to be filled.

In the eduction of liquid through the fuel passageway 7 so that it may be carried by conduit 54 to appropriate vaporizing mechanism (not shown), the liquid eduction tube 64 is filled with fuel by reason of the gas pressure within the tank, and this liquid flows upwardly through the excess flow check valve 55, which valve remains normally open unless the conduit 54 or some of its fittings breaks or leaks, whereupon a greater quantity of the liquid than is required attempts to escape; but this is prevented by the action of this check valve.

In the check valve the thimble 59 has ports or openings 60 through its walls. Normally sufficient liquid flows through the valve and the ports in the thimble to supply the needs of the vaporizer; but where a greater than normal discharge of fluid arises from a break in the line or other cause, then the ports in the thimble will not carry the increased volume of moving fluid. The result is that the velocity in the fluid movement picks up the thimble and throws it against the roof of its housing and causes it to come to rest on a specially prepared valve seat which it engages. This action closes the line and prevents the further escape of fluid. When the shutoff valve is closed there will be an infinitesimal leak of fluid from the tank into passageway 7 which will equalize the pressure and cause the thimble to drop back into its normal place.

The weight of the thimble determines its reaction to the velocity and volume of the escaping fluid, and likewise conditions its early or late return to its normal position by gravity when the leak is fixed and normal operation is resumed. Thimbles of different weights may be provided so that they will respond quicker or slower in checking the escaping fluid. When an installation is made under conditions which demand an unusually heavy flow of fuel at all times, the thimble is weighted to allow the normal passage of this larger volume.

Above the liquid eduction passageway is provided a conventional hand operated shutoff valve, which ordinarily remains open at all times, but which can be closed in order to change or clean or repair the conduit 54 or any of the fittings and equipment associated with it or to which it leads.

This conventional shutoff valve is not made the subject of any special disclosure herein nor of any claims in its construction, because it is a stock item and well known. It is not necessary to the usual and normal operation of the system in which this control head is employed, except in those rare intervals when the system is temporarily closed down, as explained above.

Because of the instant, positive and automatic operation of the excess flow check valve, there is no danger in the operation of this control head without the use of the shutoff valve. Should the shutoff valve be broken off from the head, there will be no escape of fuel from the tank, because of the immediate closure of the excess flow check valve.

If it is desired to withdraw liquid fuel from a separate and small opening at or near the bottom of the fuel storage tank, appropriate arrangement can be made to effect this object; and in such case, the fuel delivery passageway is simply plugged up and not used. In this event, however, it is desirable to still have the bottom end of this passageway carry the excess flow check valve (with or without the liquid eduction pickup pipe) so that no fuel will escape through this passage if the plug is inadvertently removed.

This head may be readily used in a butane system where it is desired to withdraw gas (not liquid) directly from the top of the storage tank and conduct it to apparatus for further vaporization, and thence to the burners. In order to do this, it is only necessary to remove and not use the tube ordinarily depending below the excess flow check valve. Gas will then flow through the fuel delivery passageway and the conduit to the place of consumption.

The safety relief valve 67 depending below the relief passageway 8 is simplicity itself. Whenever pressure increases in the tank above a predetermined safe operating pressure, the valve disc lifts off of its seat because the excess pressure overcomes the normal resistance of the valve spring; and thus relief of the excess pressure is effected. Adjustment of the pressure at which this valve will relieve is made by turning the adjusting disc to the desired position for compressing the spring.

The screen provided in the upper end of the relief passageway is merely for the purpose of keeping foreign materials and insects out of this passage.

The control head and its complement of fittings may be fully assembled and completely tested at the factory where it is made. Then it may be sent out to the field or the assembling plant where it can be installed in the fuel storage tank by the most inexperienced workman, who can easily do the job by performing one operation. He simply inserts the head in a threaded opening in the top of the storage tank and makes it up with a large wrench. Then there is nothing more to do except connect up the fuel service conduit to the hand-operated shutoff valve.

Likewise this control head and all its fittings can be easily and quickly removed by unscrewing it out of the tank. Inspection of the tank and its contents at any time, for clean-out or other purposes, is therefore easy.

Also the inspection of the valves and fittings, depending below the head, for cleaning and repair is simple and convenient.

One of the greatest advantages of this device is the carrying of the valves and fittings below the head and within the tank itself where they are exceptionally well protected.

A saving in cost, labor and materials results also from the fact that the valves and fittings depending below the head and in the tank can be made of relatively light construction, because they are not subjected to internal pressure within their bodies which could rupture them, as would be the case if they were attached to the tank externally.

The design and construction of this head and its depending fittings make this an extremely safe control device for handling the inflammable and explosive liquefied petroleum gases. These fittings inside the tank operate to close and effectively prevent the escape of fluid from the tank, even though the parts and extensions above the head itself are broken off, each and all. This is an advantage of utmost importance. It is impossible to damage the fittings depending below the control head without first rupturing the tank. No better protection can be given these valves and fittings.

The design and construction of this head and its depending valves have the further advantage of providing a control fitting in which mistakes in manufacture in one part of the fitting, such as in the threads, seats or other parts of a valve carried by the head, do not result in spoilage or loss of the entire fitting; as an entirely new valve can be substituted for one thus damaged in the process of manufacture. This is not the case in a head in which the threads, seats or other parts of the valve carried by the head are constructed as parts of the head or carrying member itself.

There is removably secured in head 2 a bushing member 30. There is slidably mounted through member 30 a slip tube 31 which is held in its normal position of complete insertion by a cap 50.

I claim:

In apparatus for controlling liquefied petroleum gas, a fitting arranged to be removably attached to a tank, the fitting being provided with a passageway therethrough; an excess flow check valve carried by the fitting and including a body portion having therein an enlarged channel communicating with the passageway; a valve seat within the channel; a movable member comprising an inverted thimble arranged within the channel and constructed to cooperate with the walls thereof to provide passage means around the thimble, said thimble being of such weight as to be movable against the seat only by an excess flow of fluid through the channel, and said weight being sufficient to provide the sole means for causing the thimble to return to its normal position when the flow is again normal.

JOHN R. HOLICER.

REFERENCES CITED

The following references are of record in the file of this patent:

UNITED STATES PATENTS

| Number | Name | Date |
|---|---|---|
| 2,121,675 | White | June 21, 1938 |
| 2,145,925 | Geisel | Feb. 7, 1939 |
| 2,172,311 | Thomas | Sept. 5, 1939 |
| 2,179,144 | Buttner | Nov. 7, 1939 |
| 2,188,597 | Holicer | Jan. 20, 1940 |
| 2,214,713 | White | Sept. 10, 1940 |
| 2,290,038 | Folmsbee | July 14, 1942 |
| 2,322,660 | Parsons | June 22, 1943 |

OTHER REFERENCES

Handbrook of Butane-Propane Gases, revised second edition, copyrighted 1938, pages 96, 97, 98, 99 and 105, relied on.